Figure 1:
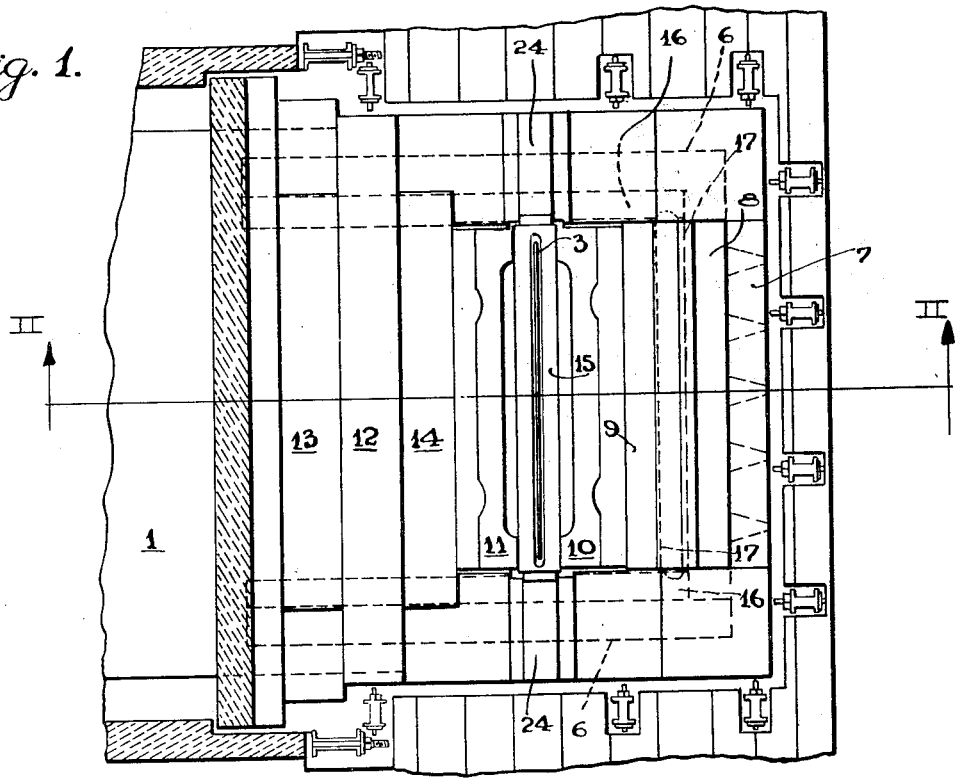

April 24, 1934.  J. S. GREGORIUS  1,956,170
APPARATUS FOR MAKING SHEET GLASS
Filed June 16, 1933  2 Sheets-Sheet 1

Patented Apr. 24, 1934

1,956,170

UNITED STATES PATENT OFFICE 1,956,170

APPARATUS FOR MAKING SHEET GLASS

Joseph S. Gregorius, Tarentum, Pa., assignor to Pittsburgh Plate Glass Company, a corporation of Pennsylvania Application June 16, 1933, Serial No. 676,096

7 Claims. (Cl. 49—17)

Figure 2:
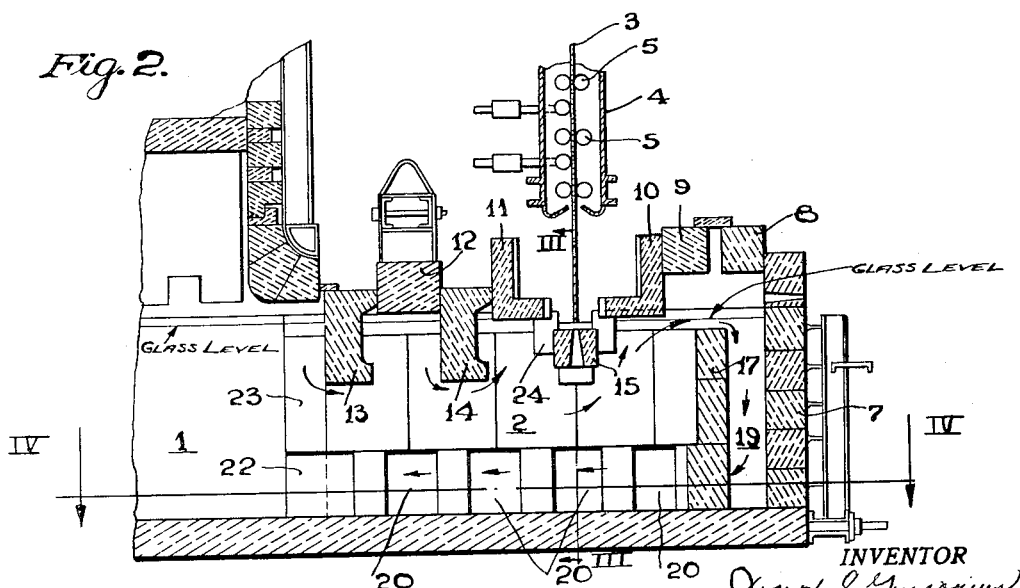
Figure 3:
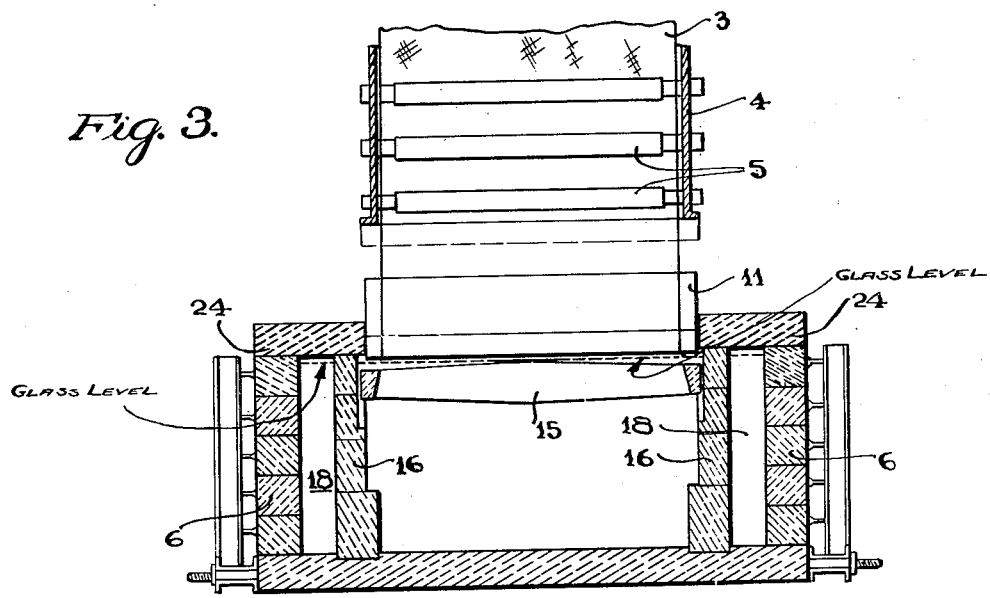
Figure 4:
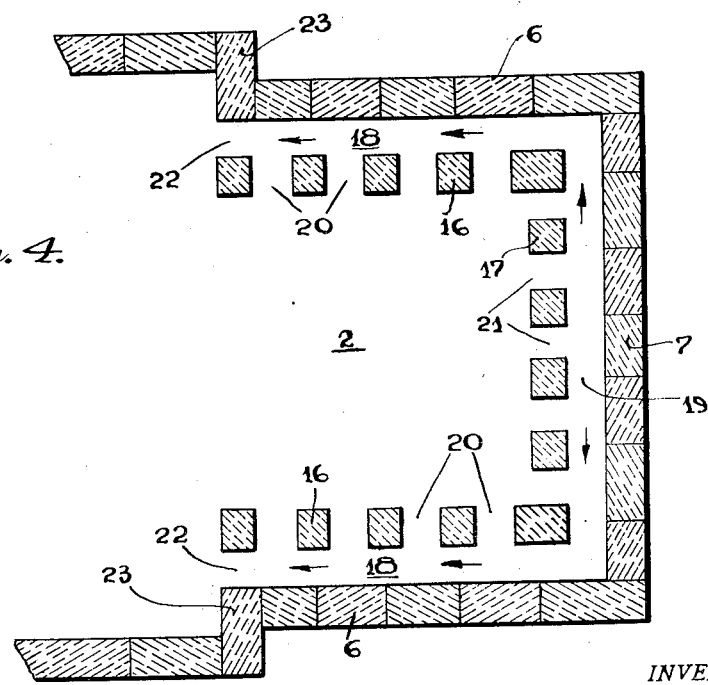

The invention relates to apparatus for making sheet glass, and particularly to the forehearth or extension from which the glass sheet or ribbon is drawn continuously. It has for its principal object the provision of means for improving the circulation of the glass in the extension, whereby such circulation is made more positive and the cooler glass in the extension, in excess of that required in the drawing operation, is carried back to the melting tank without mixing with the hotter glass which goes into the formation of the sheet. This applies particularly to the glass at the ends of the draw bar which, in the ordinary operation, becomes gradually cooler and cooler as compared with the main body of glass in the extension and finally necessitates a discontinuance of the drawing operation until the whole extension is heated up above normal temperature, thus disposing of the collection of cold glass in the vicinity of the ends of the draw bar. The present construction assists materially in obviating this difficulty, and permits of a much longer drawing operation between the reheating steps. The quality of the glass drawn is also improved, since the tendency to the formation of ream (incident to the drawing of cold glass into the sheet) and to devitrification, is reduced by the more active circulation induced by the present construction. One embodiment of the invention is shown in the accompanying drawings, wherein:

Figure 1 is a plan view. Fig. 2 is a section on the line II—II of Fig. 1. Fig. 3 is a section on the line III—III of Fig. 2. And Fig. 4 is a section on the line IV—IV of Fig. 2.

Referring to the drawings, 1 is a glass melting tank, and 2 is a forehearth or drawing extension over which is arranged suitable means for drawing the glass sheet 3 through the leer casing 4, such casing being equipped with the usual pairs of driven rolls 5, 5 for applying traction to the sheet. The extension 2 comprises the usual side and end walls 6, 6 and 7, and the cover or top consists of the members 8 to 12 and the upper ends of the skim bars 13 and 14. Extending transversely of the extension beneath the line of draw of the sheet is the usual slotted draw bar 15, such draw bar serving to provide a cooler layer of glass from which to draw, and to prevent the base of the sheet from shifting its position.

Located in the extension are the three refractory walls 16, 16 and 17, such walls being located adjacent the walls of the extension, but spaced away therefrom to provide the passageways 18, 18 and 19. These walls extend upward from the bottom of the tank to a level below that of the bath. The distance between the level of the tops of these walls and the glass level may vary somewhat, but is preferably about four inches. The walls 16, 16 and 17 are each provided with a series of spaced ports or passages 20, 20 and 21 at their lower portions, as indicated in Figs. 2 and 4, and the ends of the passageways 18, 18 communicate directly with the body of glass in the melting tank through similar ports 22, 22 at the bottoms of the short transverse walls 23, 23. The blocks constituting the lower tiers of the walls 16, 16 and 17, which are spaced apart to provide the ports 20, 20 and 21, are preferably of greater thickness than the walls thereabove, as indicated in Figs. 2 and 3.

Opposite the ends of the draw bar 15 are mounted the refractory blocks 24, 24 bridging the passageways 18, 18 and resting on the tops of the walls 6 and 16 (Figs. 1 and 3). These blocks preferably have a dimension longitudinally of the tank which is about twice the width of the draw bar (Fig. 1), but this may vary depending on conditions. They ordinarily lie with their lower surfaces just above the glass level. The function of these blocks, in conjunction with the passages 18, is to prevent an accumulation of stagnant cool glass in the areas around the ends of the draw bar. The relatively cooler glass in these areas, because of its higher specific gravity moves downward and is drawn through the ports 20, 20 into the passageways 18 and is carried back to the melting tank by the flow through such passageways. Further, the tendency of the glass to cool in the areas referred to, is substantially less than in the usual construction, since the ends of the draw bar are more remote from the walls 6, 6, and since the cooling effect of such walls is less. The blocks 24, 24 and the upper edges of the walls 16, 16 being practically surrounded by hot glass, exercise a relatively slight cooling effect on the submerged ends of the draw bar and the glass surrounding such ends.

The passageways 18 and 19 act as conduits through which a circulation of the cooler glass in the extension back to the melting tank is established, so that hot glass from the melting tank flows more freely into the extension. Normally in a forehearth construction, the surface glass (aside from that which goes into the formation of the sheet) moves to the side and end walls, and due to increase in density resulting from cooling it, sinks and becomes involved in the general movement of the glass back to the melting tank. With the present construction, the walls 17 and 18 insure that this cool glass, which moves down along the walls 6 and 7, shall not return to the main body of glass in the forehearth until it reaches the bottom of the forehearth. When returned at this low level, the cool glass will not become involved with the surface glass which goes into the formation of the sheet. This means better quality in the sheet and a more uniform temperature at the meniscus of the sheet. A part of the glass which flows downward into passageways 18 and 19 will move along these passageways and be delivered into the melting tank through the passages 22 without flowing out through the ports 20 and 21, thus preventing the main body of glass in the forehearth from being cooled as much as would be the case if the walls 16 and 17 were not used. The advantages of this modified circulation of the glass in the forehearth will be readily apparent to those skilled in the art.

What I claim is:

1. In combination with a glass melting tank, a forehearth or extension communicating with the melting tank, means intermediate the ends of the extension for drawing a glass sheet continuously therefrom, and refractory side and end walls in the extension adjacent the side and front walls of the extension respectively but spaced away therefrom extending upward from the bottom of the extension to a point adjacent to but below the glass level, said refractory side walls having ports through the lower portions thereof.

2. In combination with a glass melting tank, a forehearth or extension communicating with the melting tank, means intermediate the ends of the extension for drawing a glass sheet continuously therefrom, and refractory side and end walls in the extension adjacent the side and front walls of the extension respectively but spaced away therefrom extending upward from the bottom of the extension to a point adjacent to but below the glass level, said refractory side and end walls having ports through the lower portions thereof.

3. In combination with a glass melting tank, a forehearth or extension communicating with the melting tank, means intermediate the ends of the extension for drawing a glass sheet continuously therefrom, refractory side walls in the extension adjacent the side walls of the extension but spaced away therefrom extending from the bottom of the extension to a point adjacent to but below the glass level, a draw bar extending transversely of the extension between the refractory side walls, and a refractory block at each end of the draw bar and constituting a closure at this point for the space between the refractory side wall and the side wall of the extension.

4. In combination with a glass melting tank, a forehearth or extension communicating with the melting tank, means intermediate the ends of the extension for drawing a glass sheet continuously therefrom, refractory side walls in the extension adjacent the side walls of the extension but spaced away therefrom extending from the bottom of the extension to a point adjacent to but below the glass level, a draw bar extending transversely of the extension between the refractory side walls, and a refractory block at each end of the draw bar and constituting a closure at this point for the space between the refractory side wall and the side wall of the extension, said blocks having a dimension longitudinally of the extension which is in excess of the width of the draw bar.

5. In combination with a glass melting tank, a forehearth or extension communicating with the melting tank, means intermediate the ends of the extension for drawing a glass sheet continuously therefrom, refractory side walls in the extension adjacent the side walls of the extension but spaced away therefrom extending from the bottom of the extension to a point adjacent to but below the glass level, a draw bar extending transversely of the extension between the refractory side walls, said refractory side walls having a series of ports through the lower portions thereof, and a refractory block at each end of the draw bar and constituting a closure at this point for the space between the refractory side wall and the side wall of the extension.

6. In combination with a glass melting tank, a forehearth or extension communicating with the melting tank, means intermediate the ends of the extension for drawing a glass sheet continuously therefrom, refractory side and end walls in the extension adjacent the side and front walls of the extension respectively but spaced away therefrom extending upward from the bottom of the extension to a point adjacent to but below the glass level, and closures for the ends of the spaces between the refractory side walls and the side walls of the extension at the ends of said spaces next to the melting tank, said closures each being provided with a port through the lower portion.

7. In combination with a glass melting tank, a forehearth or extension communicating with the melting tank, means intermediate the ends of the extension for drawing a glass sheet continuously therefrom, refractory side and end walls in the extension adjacent the side and front walls of the extension respectively but spaced away therefrom extending upward from the bottom of the extension to a point adjacent to but below the glass level, and closures for the ends of the spaces between the refractory side walls and the side walls of the extension at the ends of said spaces next to the melting tank, said closures each being provided with a port through the lower portion, and said refractory side walls each being provided with a series of ports therethrough spaced along its lower portion.

JOSEPH S. GREGORIUS.